(12) United States Patent
Shi et al.

(10) Patent No.: US 12,478,348 B2
(45) Date of Patent: Nov. 25, 2025

(54) SYSTEMS AND METHODS FOR VASCULAR IMAGING

(71) Applicant: KONINKLIJKE PHILIPS N.V., Eindhoven (NL)

(72) Inventors: William Tao Shi, Wakefield, MA (US); Shiying Wang, Melrose, MA (US); Claudia Errico, Cambridge, MA (US); Hua Xie, Cambridge, MA (US); Thanasis Loupas, Kirkland, WA (US); Paul Sheeran, Woodinville, WA (US); Charles Tremblay-Darveau, Seattle, WA (US); Jeffry Earl Powers, Bainbridge Island, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 192 days.

(21) Appl. No.: 17/771,847

(22) PCT Filed: Oct. 30, 2020

(86) PCT No.: PCT/EP2020/080490
§ 371 (c)(1),
(2) Date: Apr. 26, 2022

(87) PCT Pub. No.: WO2021/084060
PCT Pub. Date: May 6, 2021

(65) Prior Publication Data
US 2023/0000467 A1    Jan. 5, 2023

Related U.S. Application Data

(60) Provisional application No. 62/929,386, filed on Nov. 1, 2019.

(51) Int. Cl.
*A61B 8/00* (2006.01)
*G06T 7/00* (2017.01)
(Continued)

(52) U.S. Cl.
CPC .......... *A61B 8/481* (2013.01); *G06T 7/0012* (2013.01); *G06V 10/25* (2022.01); *G16H 30/40* (2018.01);
(Continued)

(58) Field of Classification Search
CPC ............. A61B 8/481; G06T 7/0012; G06T 2207/10132; G06T 2207/20016; G06V 10/25; G16H 30/40
See application file for complete search history.

(56) References Cited

U.S. PATENT DOCUMENTS 6,443,896 B1    9/2002  Detmer
6,530,885 B1    3/2003  Entrekin et al.
(Continued)

FOREIGN PATENT DOCUMENTS

EP    3552551 A2    10/2019
WO    2009130647 A1    10/2009
WO    2020141127 A1    7/2020

OTHER PUBLICATIONS

International Search Report and Written Opinion for PCT/EP2020/080490, Mailing Date: Jan. 21, 2021, 12 Pages.
(Continued)

*Primary Examiner* — Rochelle D Turchen (57) ABSTRACT

Systems and methods for multi-level vascular imaging for construction and display of vasculature from large to small vessels and micro-vessels using a combination of varying resolution contrast enhanced ultrasound flow imaging modalities are disclosed. While one or more resolution flow imaging modes may be employed for imaging large to small vessels of a vascular tree within a large region of interest, a high resolution mode, such as super resolution imaging, constructed for delineation of the microvascular morphology and directional microcirculation is provided within one
(Continued)

or more small ROIs placed in selected locations within the larger ROI.

16 Claims, 5 Drawing Sheets

(51) Int. Cl.
*G06V 10/25* (2022.01)
*G16H 30/40* (2018.01)
(52) U.S. Cl.
CPC ............... *G06T 2207/10132* (2013.01); *G06T 2207/20016* (2013.01)

(56) References Cited

U.S. PATENT DOCUMENTS

| | | | |
|---|---|---|---|
| 2008/0002239 A1* | 1/2008 | Toma | G06T 3/4023 345/646 |
| 2015/0282890 A1* | 10/2015 | Cohen | A61B 5/1128 600/424 |
| 2018/0005417 A1* | 1/2018 | Schieke | G06T 11/008 |
| 2019/0365355 A1* | 12/2019 | Eldar | A61B 8/488 |
| 2020/0178939 A1* | 6/2020 | Song | A61B 8/5223 |

OTHER PUBLICATIONS

Van Sloun, R.J.G., "Sparsity-driven super-resolution in clinical contrast-enhanced ultrasound," 2017 IEEE International Ultrasonics Symposium (IUS), 2017, pp. 1-4.

Harput, S. et al., "Two-Stage Motion Correction for Super-Resolution Ultrasound Imaging in Human Lower Limb," IEEE Transactions on Ultrasonics, Ferroelectrics, and Frequency Control, 2018, vol. 65, No. 5, pp. 803-814.

Errico, C. et al., "Ultrafast ultrasound localization microscopy for deep super-resolution vascular imaging", Nature, 2015, vol. 527, No. 7579, pp. 499-502.

Eow, C. H. et al., "3-D Microvascular Imaging Using High Frame Rate Ultrasound and ASAP Without Contrast Agents: Development and Initial In Vivo Evaluation on Nontumor and Tumor Models," IEEE Transactions on Ultrasonics, Ferroelectrics, and Frequency Control, 2019, vol. 66, No. 5, pp. 939-948.

Diamantis, K. et al., "Development of Super-Resolution Sharpness-Based Axial Localization for Ultrasound Imaging," IEEE Access, 2019, vol. 7, pp. 6297-6309.

* cited by examiner

SYSTEMS AND METHODS FOR VASCULAR IMAGING

CROSS-REFERENCE TO PRIOR APPLICATIONS

This application is the U.S. National Phase application under 35 U.S.C. § 371 of International Application No. PCT/EP2020/080490, filed on Oct. 30, 2020, which claims the benefit of U.S. Provisional Patent Application No. 62/929,386, filed on Nov. 1, 2019. These applications are hereby incorporated by reference herein.

TECHNICAL FIELD

This application relates to contrast enhanced imaging. More specifically, this application relates to contrast enhanced ultrasound for vascular imaging.

BACKGROUND

In contrast-enhanced imaging, a contrast agent is provided to an area or volume to be imaged in order to provide a higher signal strength from the area or volume, or selectively enhance signals from areas or volumes with high contrast concentration. For example, in contrast-enhanced ultrasound (CEUS), microbubbles may be injected into a subject's bloodstream and ultrasound images may be acquired of the subject's vasculature. Without the microbubbles, little to no signal may be provided by the blood vessels. In contrast accumulation imaging (CAI), multiple contrast-enhanced images (e.g., multiple image frames) are acquired and combined and/or normalized to form the final image, which can be used to map contrast agent progression and enhance vessel topology and conspicuity. Temporal accumulation imaging of CEUS has been commercialized and widely used for vascular visualization. However, CEUS has limited spatial resolution due to the large size of the point spread function (PSF) in contrast mode. The PSF is a measure of blurring or spreading of a point source by an imaging system. CEUS may also have strong residual clutter artifacts as well as vulnerability to patient induced motion due to the combining of multiple image frames to form the final image.

Super-resolution imaging (SRI) is a CEUS technique that makes it potentially possible for improved diagnosis of vascular diseases and cancer malignancy by providing morphological microvascular images as well as functional microcirculation maps in depth with detail not previously possible using conventional approaches. In a common SRI technique, each super-resolved image is obtained by two steps: (1) localizing the center of each separable microbubble in an image and then (2) accumulating these centers over thousands of images. The position of each microbubble is obtained by taking the local maxima of each microbubble intensity profile. This means that the center of each microbubble can be seen and represented as a single-pixel dot. The accumulation of the center positions of microbubbles is the probability density mapping of microbubbles, which is the super-resolved image of the microvasculature.

However, the timescale of acquisition is challenging when imaging a large region or a pathology where the bubble inflow dynamics are especially important (e.g. visualizing rapid wash-in). SRI typically requires tens or hundreds of thousands of individual contrast imaging frames, corresponding to a combination of very high imaging frame rates (often >500 Hz) and very long acquisition times (e.g., several minutes) compared to conventional contrast ultrasound scans.

SUMMARY

Systems and methods for a multi-level resolution vascular imaging approach is disclosed. Systems and methods may include (1) one or more contrast imaging modes with conventional and enhanced spatial resolutions are employed to display large to small vessels of a vascular tree within a large ROI and (2) a SRI mode is created for delineation of both microvascular morphology and functional microcirculation within one or more small ROIs placed in selected locations within the large ROI. The advantages of the multi-level CEUS imaging according to principles of the present disclosure may include (1) adequate display of different levels of vascularity from large to small vessels to anatomically and functionally-detailed micro-vascular circulation; (2) shortened processing time for SRI reconstruction and consequently prompt display of the microstructure; and (3) allowing for effective correction of local physiological motion which may be crucial in SRI.

In accordance with at least one example disclosed herein, an ultrasound imaging system may include an ultrasound probe for transmitting and receiving ultrasound signals for a plurality of ultrasound images, wherein the plurality of ultrasound images are contrast enhanced ultrasound images, a display configured to display at least one of the plurality of ultrasound images, a user interface configured to receive a user input via at least one user control, wherein the user input indicates a first region of interest (ROI) within the at least one image of the plurality of ultrasound images, wherein the first ROI includes less than an entirety of the at least one of the plurality of ultrasound images, and at least one processor in communication with the user interface, the at least one processor configured to: process at least some of the plurality of ultrasound images with a first processing technique, and process in the first ROI at least some of the plurality of ultrasound images with a second processing technique, wherein the second processing technique has a higher spatial resolution and a lower temporal resolution than the first processing technique, wherein the display is further configured to display the at least some of the plurality of ultrasound images processed with the first processing technique and the at least some of the plurality of ultrasound images processed with the second processing technique.

In accordance with at least one example disclosed herein, a method may include receiving a plurality of ultrasound images, wherein the plurality of ultrasound images are contrast enhanced ultrasound images, displaying at least one of the plurality of ultrasound images, receiving an indication of a region of interest (ROI) within the at least one of the plurality of ultrasound images, wherein the ROI includes less than an entirety of the at least one of the plurality of ultrasound images, processing a first set of the plurality of ultrasound images with a first processing technique, and processing in the ROI a second set of the plurality of ultrasound images with a second processing technique, wherein the second processing technique has a higher spatial resolution and a lower temporal resolution than the first processing technique.

In accordance with at least one example disclosed herein, a non-transitory computer readable medium including instructions, that when executed, may cause an ultrasound imaging system to receive a plurality of ultrasound images, wherein the ultrasound images are contrast enhanced ultrasound images, display at least one of the plurality of ultrasound images, receive an indication of a region of interest (ROI) within the at least one of the plurality of ultrasound images, wherein the first ROI includes less than an entirety of the at least one of the plurality of ultrasound images, process a first set of the plurality of ultrasound images with a first processing technique, and process in the ROI a second set of the plurality of ultrasound images with a second processing technique, wherein the second processing technique has a higher spatial resolution and a lower temporal resolution than the first processing technique.

DESCRIPTION

The following description of certain exemplary examples is merely exemplary in nature and is in no way intended to limit the disclosure or its applications or uses. In the following detailed description of examples of the present systems and methods, reference is made to the accompanying drawings which form a part hereof, and in which are shown by way of illustration specific examples in which the described systems and methods may be practiced. These examples are described in sufficient detail to enable those skilled in the art to practice the presently disclosed systems and methods, and it is to be understood that other examples may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present disclosure. The following detailed description is therefore not to be taken in a limiting sense, and the scope of the present systems and methods is defined only by the appended claims.

As one of the major complications of diabetes, chronic kidney disease leads to significant changes of renal microvasculature and perfusion in the early stage. While contrast enhanced ultrasound (CEUS) is sensitive to changes in microvascular perfusion, early changes in microstructures and microcirculations are hard to image with conventional ultrasound due to poor spatial resolution. This also applies for early detection of chronic peripheral vascular diseases as well as early diagnosis of malignant tumors.

CEUS has been employed clinically for imaging organ/tumor vascularity as well as assessing tissue perfusion. However, its inherently low spatial resolution prevents CEUS from adapting its spatial resolution properly for different clinical needs. Owing to the lack of vascular clarity in small vessels and capillaries in conventional CEUS, super-resolution imaging (SRI) has been developed in recent years to improve the spatial resolution of ultrasound imaging by localizing contrast microbubbles flowing in microvasculature. However, as discussed previously, SRI inherently has both little motion tolerance and low temporal resolution due to its two fundamental requirements of precise microbubble localization and long frame accumulation.

Although SRI can image very fine structures and provide functional information down to the capillary level, it may be impractical to construct and display a super-resolution image of a large region (such as a large portion of an entire organ, or a tumor). In addition, it may be ineffective to utilize SRI to image and display large vessels since already existing conventional high temporal resolution imaging modalities are adequate for large vessels. Consequently, a multi-level contrast imaging approach as disclosed herein may provide more effective and/or optimal views of various levels of a particular vasculature. A multimodal ultrasound vascular imaging system according to principles of the present disclosure may be capable of providing high temporal resolution for large vessel (e.g., CEUS) and high spatial resolution for microvascular imaging (e.g., SRI).

The present disclosure is directed to systems and methods for multi-level vascular imaging for construction and display of vasculature from large to small vessels and micro-vessels using a combination of varying resolution CEUS flow imaging modalities. While one or more resolution flow imaging modes may be employed for imaging large to small vessels of a vascular tree within a large region of interest (ROI), a SRI mode is constructed for delineation of the microvascular morphology and directional microcirculation within one or more small ROIs placed in selected locations within a larger ROI. Examples of flow imaging modes include, but are not limited to CEUS, color Doppler, color power angiography (CPA), microflow imaging (MFI), CEUS-MFI, microvascular imaging (MVI), and high definition MVI (HD-MVI). In general, different vascular levels can be imaged with different modes for large vessels to small vessels to capillaries.

Figure 1:
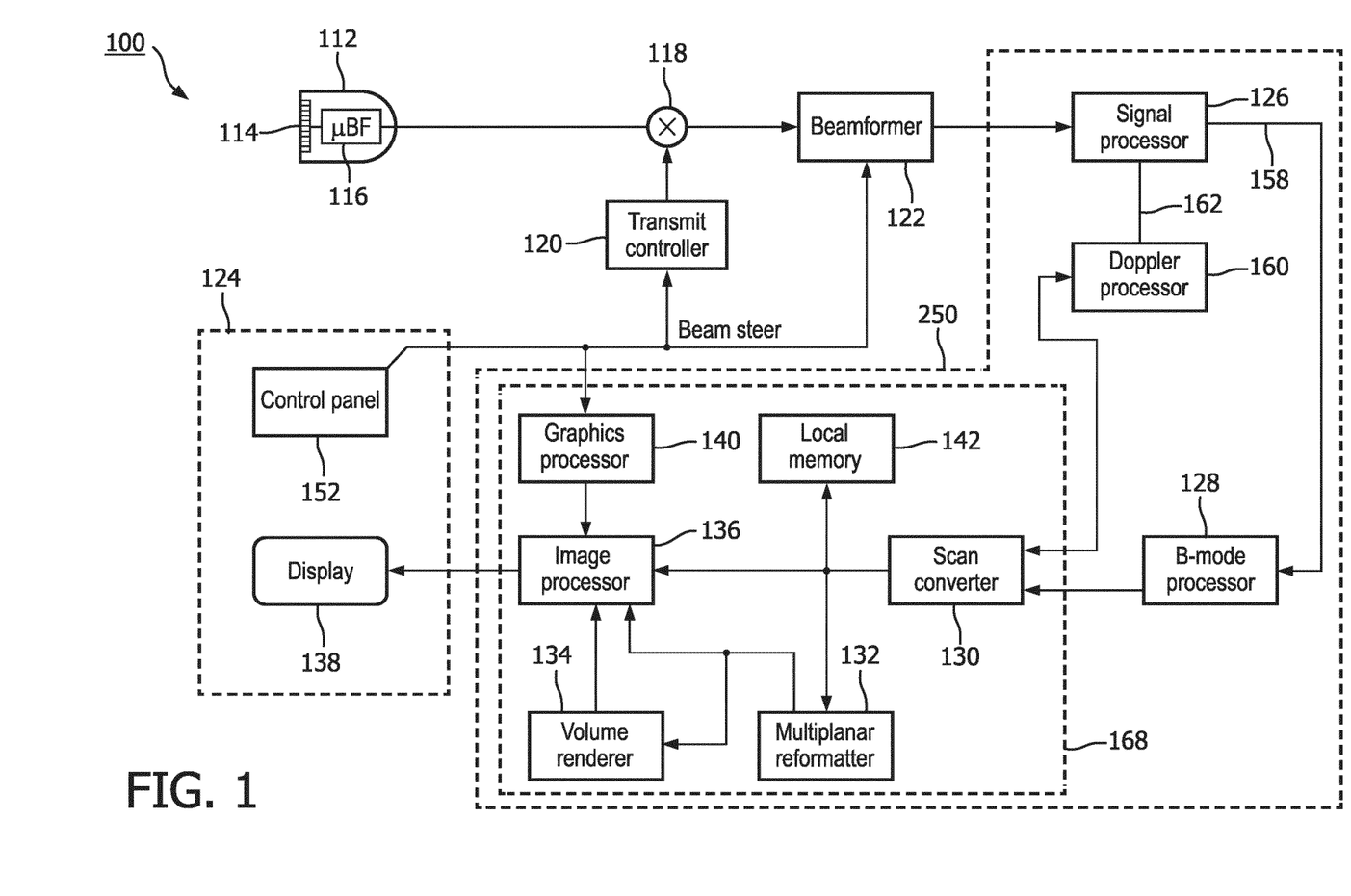
FIG. 1 is a block diagram of an ultrasound imaging system arranged in accordance with some examples of the present disclosure.

FIG. 1 shows a block diagram of an ultrasound imaging system 100 constructed in accordance with the principles of the present disclosure. An ultrasound imaging system 100 according to the present disclosure may include a transducer array 114, which may be included in an ultrasound probe 112, for example an external probe or an internal probe such as an intravascular ultrasound (IVUS) catheter probe. In other examples, the transducer array 114 may be in the form of a flexible array configured to be conformally applied to a surface of subject to be imaged (e.g., patient). The transducer array 114 is configured to transmit ultrasound signals (e.g., beams, waves) and receive echoes (e.g., received ultrasound signals) responsive to the transmitted ultrasound signals. A variety of transducer arrays may be used, e.g., linear arrays, curved arrays, or phased arrays. The transducer array 114, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some examples, the transducer array 114 may be coupled to a microbeamformer 116, which may be located in the ultrasound probe 112, and which may control the transmission and reception of signals by the transducer elements in the array 114. In some examples, the microbeamformer 116 may control the transmission and reception of signals by active elements in the array 114 (e.g., an active subset of elements of the array that define the active aperture at any given time).

In some examples, the microbeamformer 116 may be coupled, e.g., by a probe cable or wirelessly, to a transmit/receive (T/R) switch 118, which switches between transmission and reception and protects the main beamformer 122 from high energy transmit signals. In some examples, for example in portable ultrasound systems, the T/R switch 118 and other elements in the system can be included in the ultrasound probe 112 rather than in the ultrasound system base, which may house the image processing electronics. An ultrasound system base typically includes software and hardware components including circuitry for signal processing and image data generation as well as executable instructions for providing a user interface.

The transmission of ultrasonic signals from the transducer array 114 under control of the microbeamformer 116 is directed by the transmit controller 120, which may be coupled to the T/R switch 118 and a main beamformer 122. The transmit controller 120 may control the direction in which beams are steered. Beams may be steered straight ahead from (orthogonal to) the transducer array 114, or at different angles for a wider field of view. The transmit controller 120 may also be coupled to a user interface 124 and receive input from the user's operation of a user control. The user interface 124 may include one or more input devices such as a control panel 152, which may include one or more mechanical controls (e.g., buttons, encoders, etc.), touch sensitive controls (e.g., a trackpad, a touchscreen, or the like), and/or other known input devices.

In some examples, the partially beamformed signals produced by the microbeamformer 116 may be coupled to a main beamformer 122 where partially beamformed signals from individual patches of transducer elements may be combined into a fully beamformed signal. In some examples, microbeamformer 116 is omitted, and the transducer array 114 is under the control of the beamformer 122 and beamformer 122 performs all beamforming of signals. In examples with and without the microbeamformer 116, the beamformed signals of beamformer 122 are coupled to processing circuitry 150, which may include one or more processors (e.g., a signal processor 126, a B-mode processor 128, a Doppler processor 160, and one or more image generation and processing components 168) configured to produce an ultrasound image from the beamformed signals (i.e., beamformed RF data).

The signal processor 126 may be configured to process the received beamformed RF data in various ways, such as bandpass filtering, decimation, I and Q component separation, and harmonic signal separation. The signal processor 126 may also perform additional signal enhancement such as speckle reduction, signal compounding, and electronic noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 158 which couples the signals from the signal processor 126 to a B-mode processor 128 for producing B-mode image data.

The B-mode processor 128 can employ amplitude detection for the imaging of structures in the body. The B-mode processor 128 may generate signals for tissue images and/or contrast images. The signals produced by the B-mode processor 128 may be coupled to a scan converter 130 and/or a multiplanar reformatter 132. The scan converter 130 may be configured to arrange the echo signals from the spatial relationship in which they were received to a desired image format. For instance, the scan converter 130 may arrange the echo signal into a two dimensional (2D) sector-shaped format, or a pyramidal or otherwise shaped three dimensional (3D) format. In another example of the present disclosure, the scan converter 130 may arrange the echo signals into side-by-side contrast enhanced and tissue images. As explained further below, in some examples, the image processor 136 performs microbubble identification, localization, and accumulation.

The multiplanar reformatter 132 can convert echoes which are received from points in a common plane in a volumetric region of the body into an ultrasonic image (e.g., a B-mode image) of that plane, for example as described in U.S. Pat. No. 6,443,896 (Detmer). The scan converter 130 and multiplanar reformatter 132 may be implemented as one or more processors in some examples.

A volume renderer 134 may generate an image (also referred to as a projection, render, or rendering) of the 3D dataset as viewed from a given reference point, e.g., as described in U.S. Pat. No. 6,530,885 (Entrekin et al.). The volume renderer 134 may be implemented as one or more processors in some examples. The volume renderer 134 may generate a render, such as a positive render or a negative render, by any known or future known technique such as surface rendering and maximum intensity rendering.

In some examples, the system may include a Doppler signal path 162 which couples the output from the signal processor 126 to a Doppler processor 160. The Doppler processor 160 may be configured to estimate the Doppler shift and generate Doppler image data. The Doppler image data may include color data which is then overlaid with B-mode (i.e. grayscale) image data for display. The Doppler processor 160 may be configured to filter out unwanted signals (i.e., noise or clutter associated with non-moving tissue), for example using a wall filter. The Doppler processor 160 may be further configured to estimate velocity and power in accordance with known techniques. For example, the Doppler processor may include a Doppler estimator such as an auto-correlator, in which velocity (Doppler frequency) estimation is based on the argument of the lag-one autocorrelation function and Doppler power estimation is based on the magnitude of the lag-zero autocorrelation function. Motion can also be estimated by known phase-domain (for example, parametric frequency estimators such as MUSIC, ESPRIT, etc.) or time-domain (for example, cross-correlation) signal processing techniques. Other estimators related to the temporal or spatial distributions of velocity such as estimators of acceleration or temporal and/or spatial velocity derivatives can be used instead of or in addition to velocity estimators. In some examples, the velocity and power estimates may undergo further threshold detection to further reduce noise, as well as segmentation and post-processing such as filling and smoothing. The velocity and power estimates may then be mapped to a desired range of display colors in accordance with a color map. The color data, also referred to as Doppler image data, may then be coupled to the scan converter 130, where the Doppler image data may be converted to the desired image format and overlaid on the B-mode image of the tissue structure to form a color Doppler or a power Doppler image. For example, Doppler image data may be overlaid on a B-mode image of the tissue structure.

Output (e.g., B-mode images, Doppler images) from the scan converter 130, the multiplanar reformatter 132, and/or the volume renderer 134 may be coupled to an image processor 136 for further enhancement, buffering and temporary storage before being displayed on an image display 138.

In some examples, the image processor 136 may process the images using different image processing techniques. For example, the image processor 136 may collect multiple images (e.g., sequential images acquired at different time points) and combine them to generate contrast accumulation images (e.g., MVI). In some examples, the image processor 136 may also analyze individual images to locate one or more microbubbles within the image and find the centers of the microbubbles and generate one or more SRI images based on SRI image processing techniques. Other image processing techniques may also be used (e.g., color Doppler, CPA, CEUS-MFI). According to principles of the present disclosure, the image processor 136 may process different regions of the images received from the scan converter 130 using different image processing techniques. For example, one or more regions may be processed using contrast accumulation imaging techniques and one or more regions may be processed using SRI techniques.

The different processing techniques may provide images of the regions that have both different temporal and spatial resolutions. For example, a region processed by MVI techniques may have lower spatial resolution and higher spatial resolution than a region processed by SRI techniques. In some examples, higher spatial resolution may be a result, at least in part, of a greater number of image frames being combined to generate a final image of the region. In some examples, higher temporal resolution may be a result, at least in part, of a fewer number of image frames being combined and/or a faster acquisition rate by the ultrasound probe (e.g., number of frames per second).

In some examples, the one or more regions processed using different image processing techniques may at least partially overlap. In some examples, different sets of images may be processed by the image processor 136 to process the different regions with different processing techniques (e.g., every other image may be used for the first region and the other images may be used for the second region). In some examples, which regions of the images are processed by what techniques by the image processor 136 may be based, at least in part, by setting a region of interest and/or an imaging mode by a user via the user interface 124, as described further below.

According to principles of the present disclosure, in some examples, an ultrafast imaging mode with a same pulse sequence may be employed during/after the contrast agent injection/infusion. In some examples, the pulse sequence may be based on control signals provided by the transmit controller 120. In some examples, imaging frames and/or relevant RF and/or IQ-data may be streamed to a computer-readable medium (e.g., local memory 142) continuously during the entire contrast imaging length. The data may be provided from the beamformer 122, the signal processor 126, B-mode processor 128, Doppler processor 160, and/or scan converter 130. The user interface 124 may allow control of how an image or ROI of a first imaging mode (e.g., CEUS) is displayed along with one or more additional images or ROIs of different imaging modes (e.g., SRI). In other examples, if not all imaging frames and/or relevant RF/IQ-data can be saved continuously, the interleaving of two pulse sequences can be used with one for the overview mode and another for the super-resolution imaging. In some examples, if system constraints do not allow simultaneous interleave/acquisition of different imaging modes, then when SRI is selected as an imaging mode, the SRI mode may operate with a realization similar to PW Doppler where sparse updates to the reference image guide the clinician with plane selection while a long accumulation/streaming operation occupies the majority of the system process.

A graphics processor 140 may generate graphic overlays for display with the images. These graphic overlays can contain, e.g., standard identifying information such as patient name, date and time of the image, imaging parameters, and the like. For these purposes the graphics processor may be configured to receive input from the user interface 124, such as a typed patient name or other annotations. The user interface 124 can also be coupled to the multiplanar reformatter 132 for selection and control of a display of multiple multiplanar reformatted (MPR) images.

The system 100 may include local memory 142. Local memory 142 may be implemented as any suitable non-transitory computer readable medium (e.g., flash drive, disk drive). Local memory 142 may store data generated by the system 100 including B-mode images, masks, executable instructions, inputs provided by a user via the user interface 124, or any other information necessary for the operation of the system 100.

As mentioned previously system 100 includes user interface 224. User interface 124 may include display 138 and control panel 152. The display 138 may include a display device implemented using a variety of known display technologies, such as LCD, LED, OLED, or plasma display technology. In some examples, display 138 may comprise multiple displays. The control panel 152 may be configured to receive user inputs (e.g., exam type, selection of ROIs). The control panel 152 may include one or more hard controls (e.g., buttons, knobs, dials, encoders, mouse, trackball or others). In some examples, the control panel 152 may additionally or alternatively include soft controls (e.g., GUI control elements or simply, GUI controls) provided on a touch sensitive display. In some examples, display 138 may be a touch sensitive display that includes one or more soft controls of the control panel 152.

According to principles of the present disclosure, in some examples, a user may set one or more ROIs via the user interface 124. For example, the user may set a ROI on an image provided on display 138. The ROI may be set by the user by placing a selection box on the image on the display 138 by using one or more controls on the control panel 152. The user may determine an imaging mode for the portion of the image within the ROI by providing an input via the user interface 124. In some examples, the user may select one or more ROIs and indicate different imaging modes for each ROI. In some examples, an ROI may be included within and/or overlap with another ROI. In some examples, a maximum size of the ROI may be based, at least in part, on the imaging mode selected by the user. For example, a maximum size of the ROI for accumulation CEUS imaging may be larger than a maximum size of the ROI for SRI. The selected imaging modes may affect the processing of the images by the image processor 136 and/or the acquisition settings (e.g., pulse sequences indicated by the transmit controller 120) in addition to affecting the images displayed on display 138.

In some examples, various components shown in FIG. 1 may be combined. For instance, image processor 136 and graphics processor 140 may be implemented as a single processor. In another example, the scan converter 130 and multiplanar reformatter 132 may be implemented as a single processor. In some examples, various components shown in FIG. 1 may be implemented as separate components. For example, signal processor 126 may be implemented as separate signal processors for each imaging mode (e.g., B-mode, Doppler). In some examples, one or more of the various processors shown in FIG. 1 may be implemented by general purpose processors and/or microprocessors configured to perform the specified tasks. In some examples, one or more of the various processors may be implemented as application specific circuits. In some examples, one or more of the various processors (e.g., image processor 136) may be implemented with one or more graphical processing units (GPU).

Figure 2:
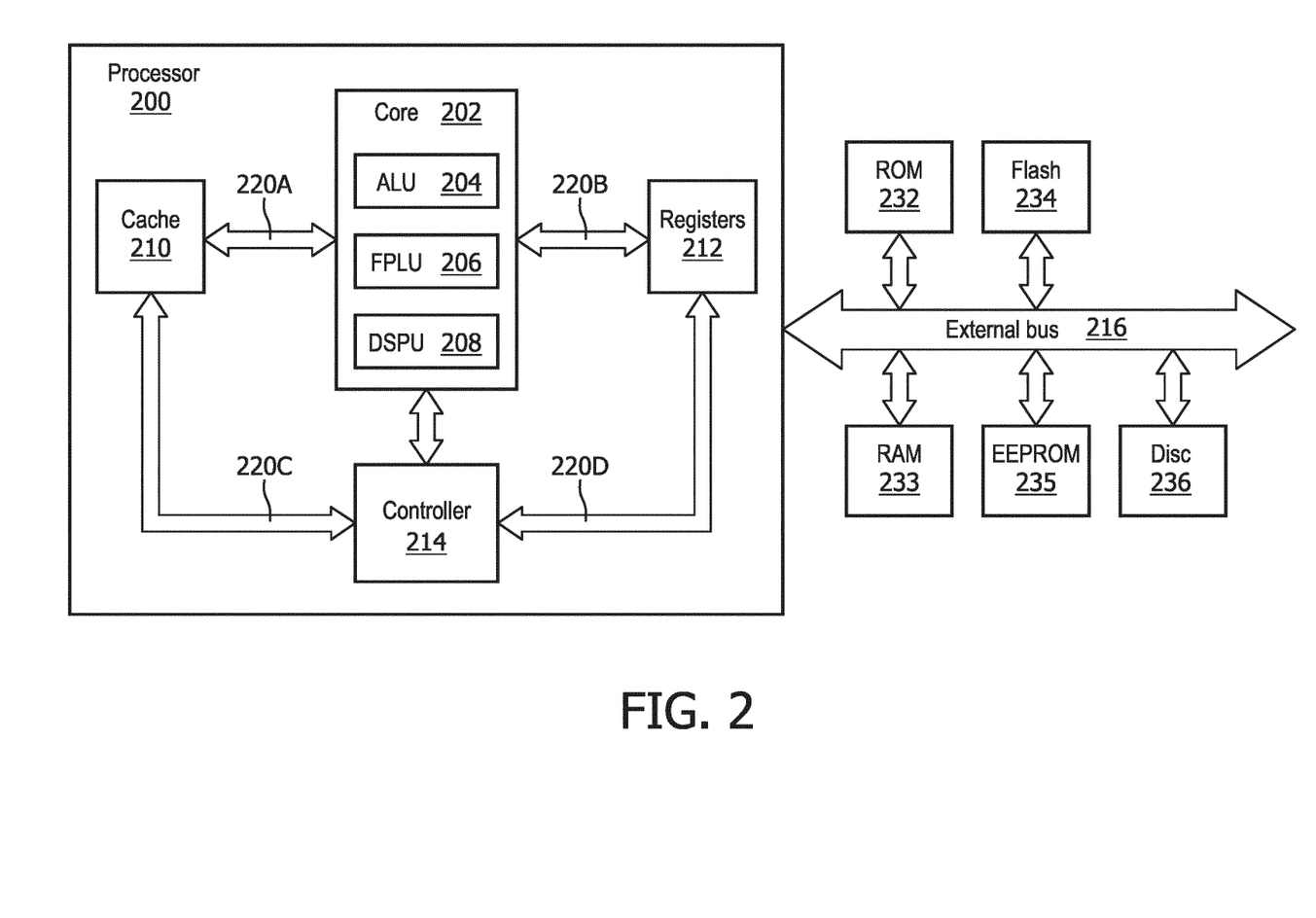
FIG. 2 is a block diagram illustrating an example processor in accordance with some examples of the present disclosure.

FIG. 2 is a block diagram illustrating an example processor 200 according to principles of the present disclosure. Processor 200 may be used to implement one or more processors described herein, for example, image processor 136 shown in FIG. 1. Processor 200 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 300 may include one or more cores 202. The core 202 may include one or more arithmetic logic units (ALU) 804. In some examples, the core 202 may include a floating point logic unit (FPLU) 206 and/or a digital signal processing unit (DSPU) 208 in addition to or instead of the ALU 204.

The processor 200 may include one or more registers 212 communicatively coupled to the core 202. The registers 212 may be implemented using dedicated logic gate circuits (e.g., flip-flops) and/or any memory technology. In some examples the registers 212 may be implemented using static memory. The register may provide data, instructions and addresses to the core 202.

In some examples, processor 200 may include one or more levels of cache memory 210 communicatively coupled to the core 202. The cache memory 210 may provide computer-readable instructions to the core 202 for execution. The cache memory 210 may provide data for processing by the core 202. In some examples, the computer-readable instructions may have been provided to the cache memory 210 by a local memory, for example, local memory attached to the external bus 3216. The cache memory 210 may be implemented with any suitable cache memory type, for example, metal-oxide semiconductor (MOS) memory such as static random access memory (SRAM), dynamic random access memory (DRAM), and/or any other suitable memory technology.

The processor 200 may include a controller 314, which may control input to the processor 200 from other processors and/or components included in a system (e.g., control panel 152 and scan converter 130 shown in FIG. 1) and/or outputs from the processor 200 to other processors and/or components included in the system (e.g., display 138 and volume renderer 134 shown in FIG. 1). Controller 214 may control the data paths in the ALU 204, FPLU 206 and/or DSPU 208. Controller 214 may be implemented as one or more state machines, data paths and/or dedicated control logic. The gates of controller 214 may be implemented as standalone gates, FPGA, ASIC or any other suitable technology.

The registers 212 and the cache 210 may communicate with controller 214 and core 202 via internal connections 220A, 220B, 220C and 220D. Internal connections may implemented as a bus, multiplexor, crossbar switch, and/or any other suitable connection technology.

Inputs and outputs for the processor 200 may be provided via a bus 216, which may include one or more conductive lines. The bus 216 may be communicatively coupled to one or more components of processor 200, for example the controller 214, cache 210, and/or register 212. The bus 216 may be coupled to one or more components of the system, such as display 138 and control panel 152 mentioned previously.

The bus 216 may be coupled to one or more external memories. The external memories may include Read Only Memory (ROM) 232. ROM 232 may be a masked ROM, Electronically Programmable Read Only Memory (EPROM) or any other suitable technology. The external memory may include Random Access Memory (RAM) 233. RAM 233 may be a static RAM, battery backed up static RAM, Dynamic RAM (DRAM) or any other suitable technology. The external memory may include Electrically Erasable Programmable Read Only Memory (EEPROM) 235. The external memory may include Flash memory 234. The external memory may include a magnetic storage device such as disc 236. In some examples, the external memories may be included in a system, such as ultrasound imaging system 100 shown in FIG. 1, for example local memory 142.

Figure 3:
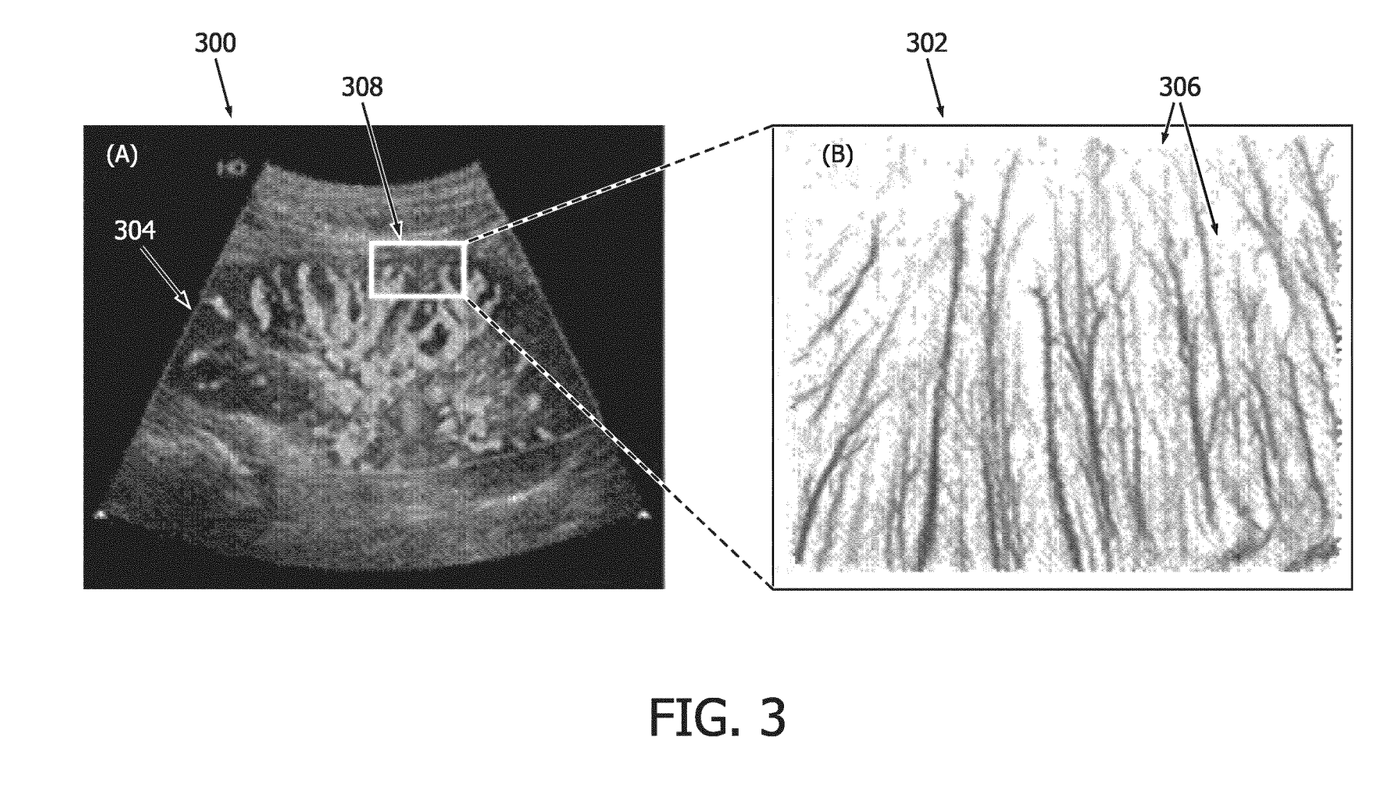
FIG. 3 is an illustration of example images for a dual-level resolution CEUS system according to principles of the present disclosure.

FIG. 3 is an illustration of example images 300, 302 for a dual-level resolution CEUS system according to principles of the present disclosure. The images 300, 302 were acquired from a kidney 304, an organ with a vascular tree. Image 300 illustrates a first imaging mode, which is a contrast—enhanced color Doppler imaging for large arteries and veins. Image 302 illustrates a second imaging mode, a SRI mode for micro structures 306 and directional microcirculation. In some embodiments, image 300 and/or image 302 may be provided as part of a sequence of images (e.g., a cineloop).

Image 300 provides an overview of substantially the entire organ with suspicious regions that may require additional investigation. A user may investigate these suspicious regions by selecting a ROI within image 300 via a user interface (user interface 124). In the example shown in FIG. 3, the ROI is selected by placing a rectangular box 308 within the image 300. The rectangular box 308 may be moved around during an interactive investigation in some examples.

The image 302 is an example of a zoomed-in detailed vascular map with both structural and functional information on the capillary flow scale obtained via SRI. In some examples, processing ultrasound images to generate the SRI image may be performed by an image processor, such as image processor 136.

In some examples, the images 300 and 302 may be generated without switching between different imaging modes, e.g., by interleaving acquisition of the ultrasound signals used to generate a respective one of the images 300 and 302. In some examples, the interleaving of these visualizations may be closely related to the pulse sequence used for one or both of the images 300 and 302 and/or post-processing. In some examples, imaging pulse sequences may be mostly determined by the position of the large region for color Doppler imaging on the image 300 and post-processing and contrast recording time may be primarily regulated by spatial resolution levels on image 302.

Figure 4:
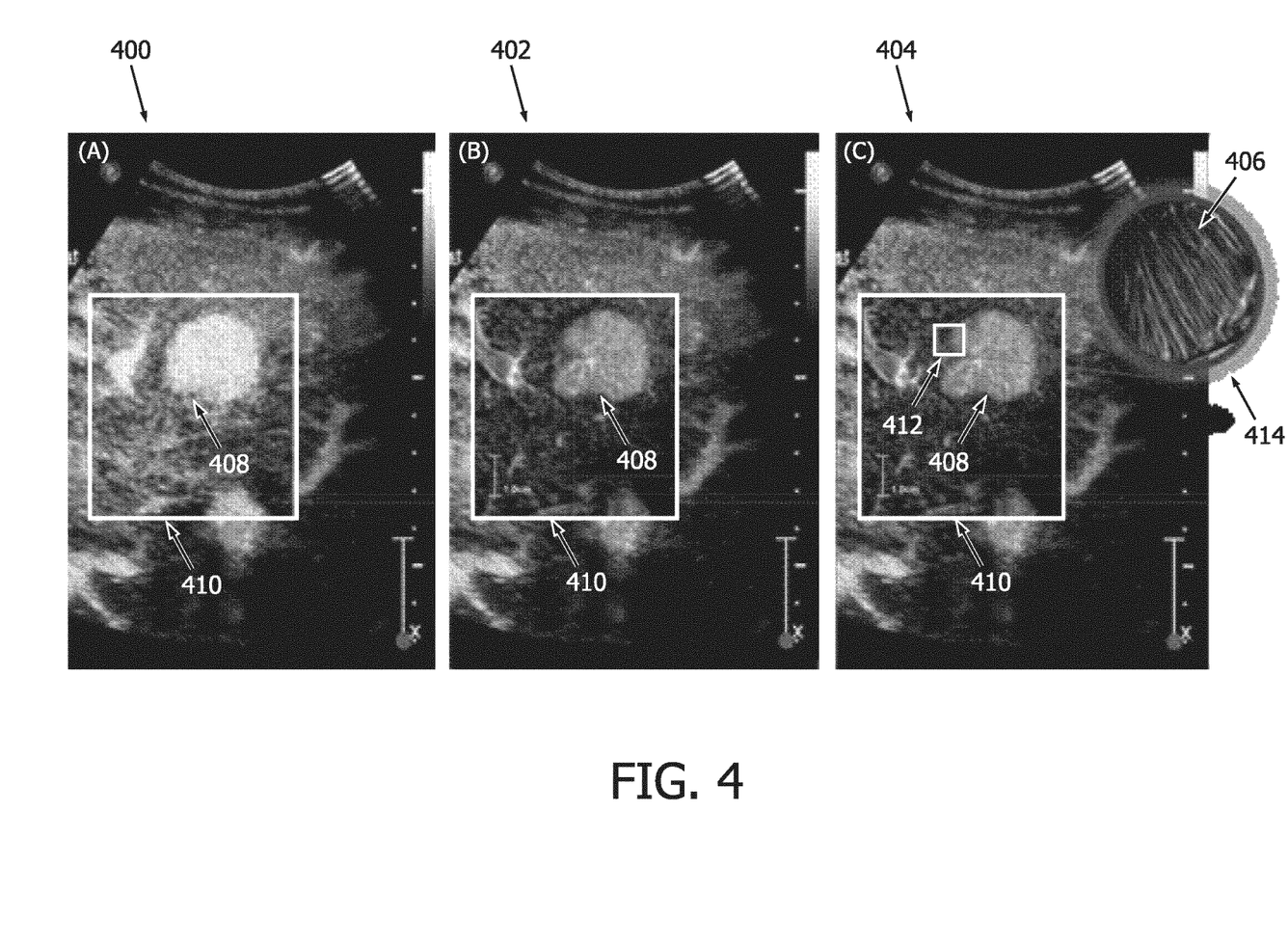
FIG. 4 is an illustration of example images for a multi-level resolution CEUS system according to principles of the present disclosure.

FIG. 4 is an illustration of example images 400, 402, 404, 406 for a multi-level resolution CEUS system according to principles of the present disclosure. The images in FIG. 4 show a tumor 408 in a liver. Image 400 is a grayscale contrast imaging image with high temporal resolution but low spatial resolution which may be useful for observing wash-in contrast kinetics of the tumor 408. Image 402 shows a high-definition accumulation imaging image within a ROI indicated by box 410. The image within box 410 has an intermediate temporal resolution and intermediate spatial resolution which may provide better vascular definition of large to small arteries in the tumor. In some examples, the image in box 410 may be generated by HD-MVI. Example systems and methods that may be used to generate the HD-MVI image is described in U.S. Provisional Patent Application 62/787,860.

Image 404 shows a second ROI indicated by box 412 placed within box 410. Image 406 is an image generated from the second ROI. Image 406 is a low temporal resolution, high spatial resolution SRI image which may allow viewing of micro structures and directional microcirculations. The lower temporal resolution may be due, at least in part, to a large number of frames that are combined to generate the SRI image. However, this large number of frames (e.g., 40,000 frames) may provide higher spatial resolution.

The terms "high," "low," and "intermediate" in reference to the resolutions of the images are used to describe resolutions of the images in reference to the resolutions of the other images shown in FIG. 4. Thus, in some examples, an image with higher temporal resolution may combine fewer frames and/or have a higher acquisition rate than an image with intermediate or lower temporal resolution. Similarly, in some examples, an image with higher spatial resolution may combine more frames and/or have more densely spaced scan lines than images with intermediate or lower spatial resolution. Furthermore, while the ROI for image 406 is shown here as selected on the intermediate image 402, in some examples, the ROI for the low temporal, high spatial resolution SRI image may be selected on the first image 400 and the intermediate image and associated steps may be omitted.

In some examples, image 406 may pop-up (e.g., pop-up window) within or adjacent to image 404. In some examples the ROIs indicated by box 410 and/or box 412 may be moved around by a user during an investigation.

As mentioned previously, an SRI image is accumulation of the center positions of microbubbles and thus the probability density mapping of microbubbles. In some examples, a confidence score may be generated based on the probability density calculations for the center positions of the microbubbles. For example, the confidence score may be calculated based on a correlation map between two or more consecutive frames used to generate the SRI image. In some examples, the correlation value between two consecutive frames may be averaged across multiple correlation values calculated for consecutive pairs of frames used to generate the SRI image. The correlation may be normalized to a value between 0 and 1. The normalized correlation value may be used as the confidence score. This confidence score may indicate that a sufficient number of frames have been accumulated for generating the SRI image and/or motion during frame accumulation was sufficiently low. In some examples, the confidence score and/or a qualitative indication of the confidence score may be provided to the user. In the example shown in FIG. 4, a ring 414 surrounding image 406 provides a qualitative indication of the confidence score by displaying different colors which correspond with different confidence score ranges. For example, ring 414 may be a first color (e.g., red) if the confidence score is below a threshold value (e.g., 0.8, 0.9) and a second color (e.g., green) if the confidence score is equal to or exceeds the threshold value. Additional colors and threshold values may be used.

As shown in FIGS. 3 and 4, there are a number of ways to reconstruct and display the multi-level vascular images according to principles of the present disclosure. In some examples, a new level of the vascular imaging within a selected "large" ROI pops up and replaces the current level image once the ROI is selected. In another example, a new level of the vascular imaging within a selected "small" ROI pops up once the ROI is selected and the new window may be displayed next to the current level image. In some examples, the two preceding examples may be combined. As discussed previously, there may be a number of control and/or display components for the user interface (e.g., user interface 124). A ROI may be selected with a pointer and/or mouse or drawn by a finger interactively on a touch image panel.

As illustrated in the example shown in FIG. 4, there are three resolution levels: The first level resolution imaging is usually a real-time CEUS for overviewing and then determining the "large" ROI enclosure of the tumor and its feeding vessels. All contrast images frames may be collected and processed by an image processor (e.g., image processor 136) once contract injection is indicated by the user via the user interface. The second level resolution imaging is an accumulation imaging mode with its resolution enhanced with microbubble localization and tracking techniques (e.g., HD-MVI). Once the "large" ROI window is selected, the HD-MVI image within the window will be updated continuously with images frames acquired before and after the ROI selection. The temporal interval for the imaging accumulation may be controlled by the user via the user interface in some examples. The third level resolution imaging is a super-resolution imaging (SRI) mode. Once the "small" ROI is selected, a SRI image within a pup-up window will be updated until sufficient image frames are collected (with images frames acquired before and after the ROI selection).

Figure 5:
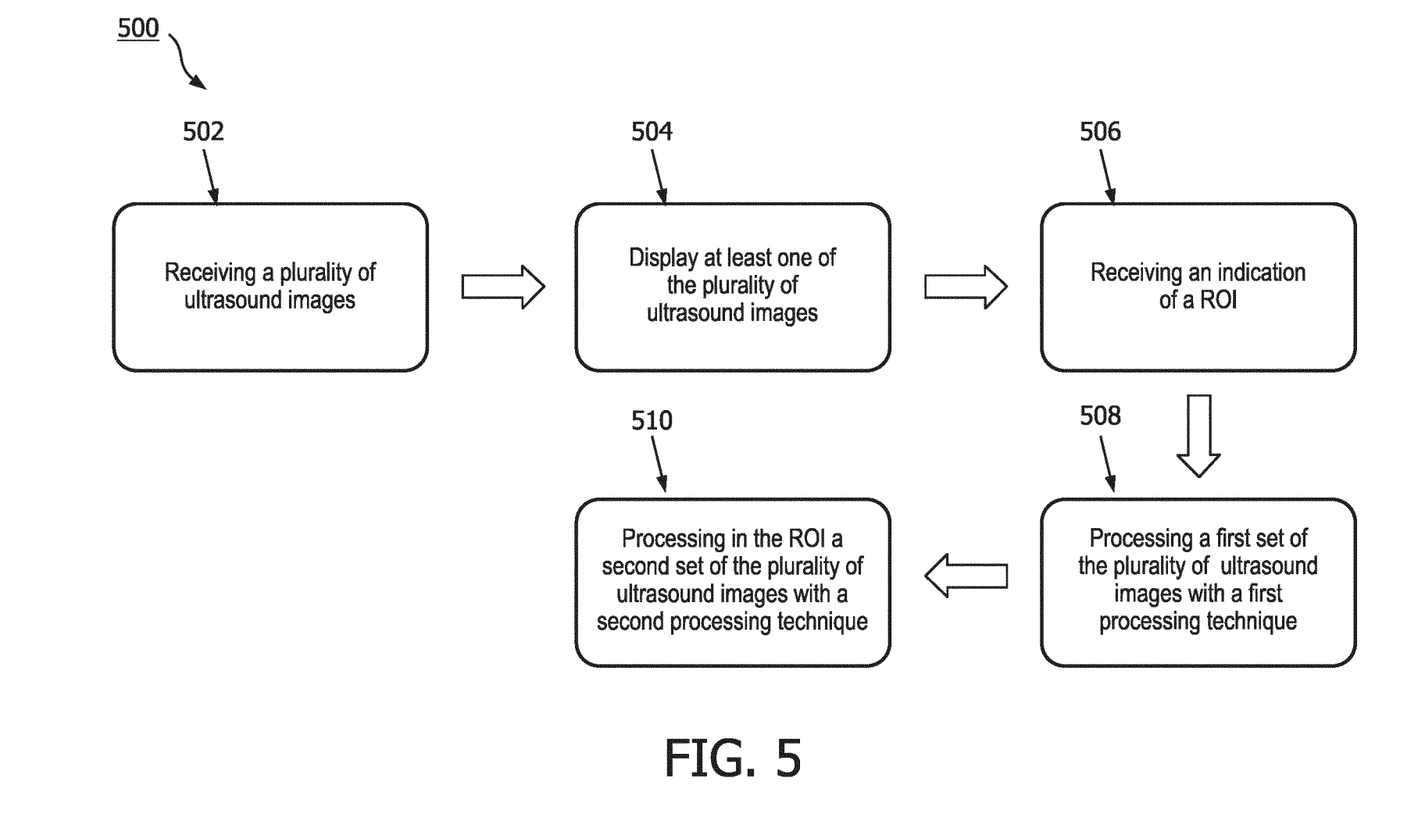
FIG. 5 is a flow chart of a method according to principles of the present disclosure.

FIG. 5 is a flow chart 500 of a method according to principles of the present disclosure. In some examples, the method may be performed by the system 100 shown in FIG. 1.

At block 502, a step of "receiving a plurality of ultrasound images" may be performed. In some examples, the ultrasound images may be received by an image processor, such as image processor 136. At block 504, a step of "displaying at least one of the plurality of ultrasound images" may be performed. The ultrasound images may be displayed on a display, such as display 138 in some examples.

At block 506, a step of "receiving an indication of a ROI" may be performed. In some examples, the ROI may be indicated within the at least one of the plurality of ultrasound images. In some examples, the ROI includes less than an entirety of the at least one of the plurality of ultrasound images. In some examples, the indication may be a user input received via a user interface, such as user interface 124. In some examples, a user may use a control panel 152 to provide the user input to indicate the ROI.

At block 508, a step of "processing a first set of the plurality of ultrasound images with a first processing technique" may be performed. At block 510, a step of "processing in the ROI a second set of the plurality of ultrasound images with a second processing technique" may be performed. In some examples, the processing may be performed by the image processor. In some examples, the second processing technique may haves a higher spatial resolution and a lower temporal resolution than the first processing technique. In some examples, the first set and the second set include the same images. In some examples, the first processing technique may be a contrast enhanced ultrasound processing technique and the second processing technique may be a super resolution imaging (SRI) processing technique. In other examples, the first processing technique may be a Doppler processing technique. In some examples, block 510 may be performed before block 508. In some examples, blocks 508 and 510 may be performed simultaneously.

In some examples, the method shown in FIG. 5 may further include displaying the images processed by the first and/or second processing techniques, for example, on the display.

Optionally, in some examples, the method shown in FIG. 5 may further include calculating a confidence score when the second processing technique is an SRI processing technique. The confidence score may be based, at least in part, on the SRI processing technique. In some examples, the confidence score may be displayed with the ultrasound images. In some examples, the confidence score may be provided qualitatively, for example, as a colored ring as discussed in reference to FIG. 4.

In some examples, the method shown in FIG. 5 may further include acquiring ultrasound signals for generating the plurality of ultrasound images. The acquiring may be performed by an ultrasound transducer array, such as transducer array 114 included in ultrasound probe 112. In some examples, the acquiring may be under the control of a transmit controller, such as transmit controller 120. The control signals may indicate one or more pulse sequences in some examples. In some examples, acquisition of ultrasound signals for generating the first set of the plurality of ultrasound images are interleaved with acquisition of ultrasound signals for generating the second set of the plurality of ultrasound images. For example, the interleaving may be based on control signals provided by the transmit controller to the ultrasound probe. In some examples, the method shown in FIG. 5 may further continuously streaming data corresponding to the ultrasound signals to a computer readable medium, for example, local memory 142.

Two non-limiting examples of interleaved acquisition are provided herein for illustration of the principles of the present disclosure. In a first example, the frame-to-frame interleaving is performed. In this form of interleaving, one or more frames of a first imaging type are acquired followed by acquisition of one or more frames of a second imaging type. In some applications, this may be followed by acquisition of one or more frames of a third imaging type. This acquisition sequence is then repeated for the duration of the scan, or at least as long as images of the different imaging modes are desired. For example, a B-mode frame, which may be displayed as either a "nonlinear" contrast image for microbubbles, or a "linear" anatomic image for tissue, or both, a color imaging frame (e.g., Doppler power or velocity map, or both), and/or a number of SRI frames can be selectively put together in one or more frame-to-frame sequences in any order. In some cases, the SRI image may be an accumulation of many ultra-fast imaging frames.

In a second interleaving example, all of the acquired frames are same (e.g., each frame for B-mode and/or color Doppler, SRI. That is, the acquisition parameters for generating the different images may be the same. For example, an ultra-fast imaging frame may include multiple beams and/or directions and/or a number of pulses that are transmitted and received along each beam or direction. In some examples, the pulses may be different (e.g., different frequency, duration, intensity). The received pulses from multiple frames may then be extracted and/or accumulated to form images for the different imaging modes (e.g., B-mode, color Doppler, and/or SRI images). For example, if transmit pulse waveforms for B-mode, color Doppler, and SRI are different, the pulses for B-mode, color Doppler, and SRI may be transmitted along the same beam or direction in sequence. In another example, if transmit pulse waveforms for B-mode or color Doppler are the same as a part of SRI waveforms, the pulses for SRI alone may be sufficient.

Optionally, in some examples, the method shown in FIG. 5 may further include receiving an indication of a second ROI, for example, via the user interface. The method may further include processing in the second ROI a third set of the plurality of ultrasound images with a third processing technique. Again, the processing may be performed by an image processor. In some examples, the third processing technique may have a higher spatial resolution and a lower temporal resolution than the first processing technique and a lower spatial resolution and higher temporal resolution than the second processing technique.

The advantages of the multi-level vascular imaging according to the principles of the present disclosure may include adequate display of spatially detailed micro-vasculature within small ROIs, shortened processing time for SRI reconstruction for prompt display of the microstructure, and allowing for effective correction of localized physiological motion which may be important in SRI.

In various examples where components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software, and/or firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instructions to perform the functions described herein.

Although the present system may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, examples or processes described herein may be combined with one or more other examples, examples and/or processes or be separated and/or performed amongst separate devices or device portions in accordance with the present systems, devices and methods.

Finally, the above-discussion is intended to be merely illustrative of the present systems and methods and should not be construed as limiting the appended claims to any particular example or group of examples. Thus, while the present system has been described in particular detail with reference to exemplary examples, it should also be appreciated that numerous modifications and alternative examples may be devised by those having ordinary skill in the art without departing from the broader and intended spirit and scope of the present systems and methods as set forth in the claims that follow. Accordingly, the specification and drawings are to be regarded in an illustrative manner and are not intended to limit the scope of the appended claims.

What is claimed is:

1. An ultrasound imaging system comprising:
a display configured to display at least one of a plurality of ultrasound images generated by an ultrasound probe for transmitting-receiving ultrasound signals, wherein the plurality of ultrasound images are contrast-enhanced ultrasound images;
a user interface configured to receive a user input via at least one user control, wherein the user input indicates a first region of interest (ROI) within the at least one image of the plurality of ultrasound images, wherein the first ROI includes less than an entirety of the at least one of the plurality of ultrasound images; and
at least one processor in communication with the user interface, the at least one processor configured to:
process at least some of the plurality of ultrasound images with a first processing technique, wherein the first processing technique is a contrast enhanced ultrasound processing technique;
process in the first ROI at least some of the plurality of ultrasound images with a second processing technique, wherein the second processing technique has a higher spatial resolution and a lower temporal resolution than the first processing technique, wherein the second processing technique is a super resolution imaging (SRI) processing technique; and
generate a confidence score based on a correlation map between two or more consecutive ultrasound images processed with the second processing technique, wherein the SRI processing technique comprises an accumulation of center positions of microbubbles from the contrast enhanced ultrasound processing technique and the confidence score is based on probability density calculations for the center positions of the microbubbles, and further wherein the generated confidence score indicates that at least one of a sufficient number of frames have been accumulated for generating the SRI image and an indication that motion during frame accumulation was sufficiently low;
wherein the display is further configured to display the at least some of the plurality of ultrasound images processed with the first processing technique and the at least some of the plurality of ultrasound images processed with the second processing technique, and
wherein the display is further configured to display the generated confidence score and/or a qualitative indication of the generated confidence score.

2. The ultrasound system of claim 1, wherein the user input further indicates a first imaging mode, wherein the second processing technique is based, at least in part, on the first imaging mode.

3. The ultrasound imaging system of claim 2, further comprising:
an ultrasound probe for transmitting receiving ultrasound signals for a plurality of ultrasound images, wherein the plurality of ultrasound images are contrast enhanced ultrasound images; and
a transmit controller in communication with the ultrasound probe, wherein the transmit controller is configured to provide control signals to the ultrasound probe to control transmission or receiving of the ultrasound signals, wherein the control signals are based, at least in part, on the first imaging mode.

4. The ultrasound imaging system of claim 3, wherein the control signals indicate a pulse sequence to be transmitted by the ultrasound probe.

5. The ultrasound imaging system of claim 1, wherein the user input further indicates a second ROI and the at least one processor is further configured to process in the second ROI at least some of the plurality of ultrasound images with a third processing technique, wherein the third processing technique has a higher spatial resolution and a lower temporal resolution than the first processing technique and a lower spatial resolution and higher temporal resolution than the second processing technique.

6. The ultrasound imaging system of claim 1, wherein the confidence score is provided on the display as a ring around the first ROI, wherein a color of the ring is based on a value of the confidence score with respect to a threshold value.

7. The ultrasound imaging system of claim 1, wherein the first ROI may be moved within the at least one image of the plurality of ultrasound images.

8. The ultrasound imaging system of claim 1, wherein the display is further configured to display the at least some of the plurality of ultrasound images processed with the second processing technique overlaid on top of the at least some of the plurality of ultrasound images processed with the first processing technique.

9. The ultrasound imaging system of claim 1, wherein the display is further configured to display the at least some of the plurality of ultrasound images processed with the second processing technique as a pop-up.

10. A method comprising:
receiving a plurality of ultrasound images, wherein the plurality of ultrasound images are contrast enhanced ultrasound images;
displaying at least one of the plurality of ultrasound images;
receiving an indication of a region of interest (ROI) within the at least one of the plurality of ultrasound images, wherein the ROI includes less than an entirety of the at least one of the plurality of ultrasound images;
processing a first set of the plurality of ultrasound images with a first processing technique, wherein the first processing technique is a contrast enhanced ultrasound processing technique;
processing in the ROI a second set of the plurality of ultrasound images with a second processing technique, wherein the second processing technique has a higher spatial resolution and a lower temporal resolution than the first processing technique, wherein the second processing technique is a super resolution imaging (SRI) processing technique;
calculating a confidence score based on a correlation map between two or more consecutive ultrasound images processed with the second processing technique, wherein the SRI processing technique comprises an accumulation of center positions of microbubbles from the contrast enhanced ultrasound processing technique and the confidence score is based on probability density calculations for the center positions of the microbubbles, and further wherein the generated confidence score indicates that at least one of a sufficient number of frames have been accumulated for generating the SRI image and an indication that motion during frame accumulation was sufficiently low;
providing to the user the calculated confidence score and/or a qualitative indication of the confidence score; and
displaying at least some of the plurality of ultrasound images processed with the first processing technique, the at least some of the plurality of ultrasound images processed with the second processing technique, and the calculated confidence score and/or the qualitative indication of the confidence score.

11. The method of claim 10, wherein, the first set and the second set include same images of the plurality of the ultrasound images.

12. The method of claim 10, further comprising acquiring ultrasound signals for generating the plurality of ultrasound images.

13. The method of claim 12, further comprising continuously streaming data corresponding to the ultrasound signals to a computer readable medium.

14. The method of claim 12, wherein acquisition of ultrasound signals for generating the first set of the plurality of ultrasound images are interleaved with acquisition of ultrasound signals for generating the second set of the plurality of ultrasound images.

15. The method of claim 10, further comprising:
receiving an indication of a second ROI;
processing in the second ROI a third set of the plurality of ultrasound images with a third processing technique, wherein the third processing technique has a higher spatial resolution and a lower temporal resolution than the first processing technique and a lower spatial resolution and higher temporal resolution than the second processing technique.

16. A non-transitory computer readable medium including instructions, that when executed, cause an ultrasound imaging system to:
receive a plurality of ultrasound images, wherein the ultrasound images are contrast enhanced ultrasound images;
display at least one of the plurality of ultrasound images;
receive an indication of a region of interest (ROI) within the at least one of the plurality of ultrasound images, wherein the first ROI includes less than an entirety of the at least one of the plurality of ultrasound images;
process a first set of the plurality of ultrasound images with a first processing technique, wherein the first processing technique is a contrast enhanced ultrasound processing technique;
process in the ROI a second set of the plurality of ultrasound images with a second processing technique, wherein the second processing technique has a higher spatial resolution and a lower temporal resolution than the first processing technique, wherein the second processing technique is a super resolution imaging (SRI) processing technique;
generate a confidence score based on a correlation map between two or more consecutive ultrasound images processed with the second processing technique, wherein the SRI processing technique comprises an accumulation of center positions of microbubbles from the contrast enhanced ultrasound processing technique and the confidence score is based on probability density calculations for the center positions of the microbubbles, and further wherein the generated confidence score indicates that at least one of a sufficient number of frames have been accumulated for generating the SRI image and an indication that motion during frame accumulation was sufficiently low;
provide to the user the calculated confidence score and/or a qualitative indication of the confidence score; and
display the at least some of the plurality of ultrasound images processed with the first processing technique and the at least some of the plurality of ultrasound images processed with the second processing technique.

* * * * *